(12) United States Patent
Erana Hernando et al.

(10) Patent No.: US 10,882,792 B2
(45) Date of Patent: Jan. 5, 2021

(54) CERAMIC COMPOSITION AND MATERIAL COMPRISING SAID CERAMIC COMPOSITION AS PART OF A HEAT RECOVERY UNIT

(71) Applicant: TUBACOAT, S.L., Leioa (ES)

(72) Inventors: Ruben Erana Hernando, Leioa (ES); Micael Presa Aller, Leioa (ES)

(73) Assignee: TUBACOAT, S.L., Leioa (ES)

( * ) Notice: Subject to any disclaimer, the term of this patent is extended or adjusted under 35 U.S.C. 154(b) by 0 days.

(21) Appl. No.: 16/321,148

(22) PCT Filed: Jul. 28, 2017

(86) PCT No.: PCT/EP2017/069121
§ 371 (c)(1),
(2) Date: Jan. 28, 2019

(87) PCT Pub. No.: WO2018/019981
PCT Pub. Date: Feb. 1, 2018

(65) Prior Publication Data
US 2019/0161411 A1    May 30, 2019

(30) Foreign Application Priority Data

Jul. 28, 2016  (EP) .................................... 16181696

(51) Int. Cl.
*C04B 35/14*    (2006.01)
*C04B 35/12*    (2006.01)
(Continued)

(52) U.S. Cl.
CPC .......... *C04B 35/14* (2013.01); *C04B 35/6261* (2013.01); *C04B 35/6263* (2013.01); *C04B 35/62655* (2013.01); *C04B 35/64* (2013.01); *C23C 24/10* (2013.01); *C04B 2235/3201* (2013.01); *C04B 2235/3203* (2013.01); *C04B 2235/3212* (2013.01); *C04B 2235/3215* (2013.01); *C04B 2235/3217* (2013.01); *C04B 2235/3232* (2013.01); *C04B 2235/3241* (2013.01); *C04B 2235/3244* (2013.01); *C04B 2235/3262* (2013.01); *C04B 2235/3409* (2013.01); *C04B 2235/5427* (2013.01);
(Continued)

(58) Field of Classification Search
CPC .......... C04B 35/12; C04B 35/14; C23C 24/10
See application file for complete search history.

(56) References Cited

FOREIGN PATENT DOCUMENTS

| CN | 101274818 A | 10/2008 |
|---|---|---|
| CN | 101570398 A | 11/2009 |

(Continued)

OTHER PUBLICATIONS

Schutz et al.;"High temperature (salt melt) corrosion tests with ceramic-coated steel"; Materials Chemistry and Physics; 2015; p. 10-18; vol. 159; Elsevier.

(Continued)

*Primary Examiner* — Karl E Group
(74) *Attorney, Agent, or Firm* — Hayes Soloway PC (57) ABSTRACT

The invention relates to a ceramic composition and a material comprising said ceramic composition in the form of a coating and a steel substrate. Furthermore, the invention relates to the process to obtain said material and its use as part of a heat recovery unit.

15 Claims, 7 Drawing Sheets

(51) Int. Cl.
*C04B 35/626* (2006.01)
*C04B 35/64* (2006.01)
*C23C 24/10* (2006.01)

(52) U.S. Cl.
CPC .. *C04B 2235/5436* (2013.01); *C04B 2235/96* (2013.01); *C04B 2235/963* (2013.01); *C04B 2235/9607* (2013.01)

(56) References Cited

FOREIGN PATENT DOCUMENTS

| | | | |
|---|---|---|---|
| DE | 19852366 A1 * | 5/2000 | ........... C04B 41/009 |
| EP | 0577119 A2 | 1/1994 | |
| EP | 2292357 A1 | 3/2011 | |
| EP | 2881440 A1 | 6/2015 | |

OTHER PUBLICATIONS

Goncalves et al.;"Sn(1-x)LaxO2 thin films deposited on ALSI 304 stainless steel substrates"; Ceramics International; 2014; p. 12359-12366; vol. 40; Elsevier.

* cited by examiner

CERAMIC COMPOSITION AND MATERIAL COMPRISING SAID CERAMIC COMPOSITION AS PART OF A HEAT RECOVERY UNIT

The invention relates to a ceramic composition and a material comprising said ceramic composition in the form of a coating and a steel substrate. Furthermore, the invention relates to the process to obtain said material and its use as part of a heat recovery unit.

BACKGROUND ART

The purpose of heat recovery units is to recover waste heat and re-use it. Heat recovery boilers, particularly the tubes contained in it are suffering chemical corrosion caused by the exposition to fumes, ashes, soot and coke particles that stick to the tube surfaces and results in chemical corrosion and efficiency losses of the heat recovery unit. Fire-side fouling is a major operational issue for many industrial facilities. Fouling occurs throughout the convection sections. Ashes and soot depositions on active surfaces provoke chemical corrosion at high temperature and a thermal transfer loss which decreases the boiler operational efficiency.

Several different cleaning methods are currently used to clean the convection zone of ash deposits, including off-line hydroblasting, on-line hydroblasting, on-line explosives cleaning, sootblowers and sonic horns. Cleaning methods are scheduled with a different frequency depending on the severity of the working conditions, but in all cases are expensive methods.

For the reasons stated above, it is needed to develop longer life time tubes for heat recovery units under severe corrosive and high temperature environments that avoid the sticking of fumes, ashes, soot and coke particles.

SUMMARY OF THE INVENTION

A first aspect of the present invention relates to a ceramic composition (herein "the ceramic composition of the invention") characterized in that it comprises a weight percent with respect to the end ceramic composition expressed in terms of the following equivalent oxides:
between 54% and 66% of $SiO_2$,
between 10% and 20% of $Cr_2O_3$,
between 3% and 12% of $Na_2O$, and
between 3% and 12% of $ZrO_2$.

In a preferred embodiment, the composition of the invention comprises up to 10% of an oxide selected from the list consisting of $Al_2O_3$, $B_2O_3$, BaO, CaO, CoO, $K_2O$, $Li_2O$, $MnO_2$, $TiO_2$ or any combination thereof.

Preferably, the composition of the invention comprises a weight percent with respect to the end ceramic composition expressed in terms of the following equivalent oxides:
between 54% and 66% of $SiO_2$,
between 12% and 20% of $Cr_2O_3$,
between 5% and 12% of $Na_2O$, and
between 5% and 12% of $ZrO_2$.

A further aspect of the present invention relates to a material (herein "the material of the invention") which is characterized in that it comprises the above mentioned ceramic composition as a homogeneous coating of the invention and a substrate of steel.

Preferably, the ceramic coating has a thickness of between 50 µm and 300 µm. More preferably, it has a thickness of between 100 µm and 160 µm.

In the sintering process, due to the degasification of the substrate and the internal reactions in the coating, an amorphous structure of small bubbles is developed in the coating. The level of porosity in the coating is therefore higher than 10% in area; preferably the porosity ranges between 15% and 35%.

The presence of that bubbles does not affect the chemical resistance of the material of the invention, but it pleasingly enhances mechanical properties as elasticity, tensile strength and scratch resistance of the material of the invention.

In a preferred embodiment of the present invention, the substrate is a tube and the ceramic composition mentioned above is deposited on at least one of its surfaces. The ceramic composition can be deposited onto the inner surface of the tube, the outer surface of the tube or onto the inner and the outer surface of the tube. Preferably, the ceramic composition is deposited on the outer surface of the tube.

A further aspect of the present invention relates to a process to obtain the material of the invention that comprises the following steps:
a) preparing a suspension of the ceramic composition of the invention as described before and a solvent, said suspension having an average particle size of between 40 µm and 200 µm,
b) pretreating at least one surface of the substrate,
c) depositing the suspension obtained in step (a) onto the pretreated surface of step (b),
(d) drying the coating obtained in step (c), and
(e) sintering the material obtained in step (d) at temperatures between 700° C. and 1000° C.

Step (a) relates to the preparation of a suspension of the ceramic composition mentioned before and a solvent, said suspension having an average particle size of between 40 µm and 200 µm.

In a preferred embodiment, the weight percent of the ceramic composition ranges from 65% to 75% with respect to the end suspension.

In another preferred embodiment, the weight percent of the solvent ranges from 25% to 35% with respect to the end suspension.

The solvent of step (a) is preferably water. The suspension is a smooth and homogeneous paste with an average particle size of between 40 µm and 200 µm.

Preferably, the suspension is obtained by grinding a borosilicate glass, clay, borax, sodium nitrite and water.

The surface of the substrate should be pretreated before deposition of the frit. It is very important to guarantee a clean surface free of contaminants, external particles and/or chemical residues, to get a good bonding/adherence between the ceramic coating and the substrate. Surface pretreatment can be shot blasting, sand blasting, pickling and passivation. Preferably step (b) is performed by shot blasting.

Step (c) refers to the deposition of the suspension obtained in step (a) onto the pretreated surface of step (b). Any applicable techniques for the deposition, that is, any competitive deposition technique compatible with manufacturing process can be used in step (c); preferably electrophoretic deposition (EPD), dipping, waterfall glazing and spraying. More preferably, step (c) is performed by spraying.

The deposition process of step (c) should provide a homogeneous coating layer along the substrate, for instance, along the tube length, ensuring both proper surface wetting and drainage of excess suspension.

Next step, step (d) refers to the complete drying of the coating obtained in step (c) at a controlled temperature ranging from 50° C. to 150° C., to remove the residual humidity by means of conventional heating system, based on convention, conduction, resistance, radiance or induction technologies. Preferably, step (d) is performed at a temperature ranging from 70° C. to 120° C.

The process of the invention finish with the sintering the material obtained in step (e) at temperatures between 700° C. and 1000° C.; the material obtained in step (d) is heated up gradually until it reaches the sintering temperature. A closed loop system keeps the temperature constant during sintering process. That sintering temperature, a range of between 700° C. and 1000° C., is closely linked to the mechanical and the chemical properties of final coated material; the sintering temperature is chosen to provide a final material for optimum performance under working conditions of a heat recovery unit. Preferably, the sintering temperature ranges from 850° C. and 950° C. Please note, that the sintering temperature tolerance ±30° C. around specified set point, preferably ±10° C. Furthermore, natural or forced cool-down procedure may be applied, preferably natural cooling at room temperature.

The material of the invention is formed by a steel substrate and a ceramic composition as expressed in terms of the following equivalent oxides:
between 54% and 66% of $SiO_2$,
between 10% and 20% of $Cr_2O_3$,
between 3% and 12% of $Na_2O$, and
between 3% and 12% of $ZrO_2$.

As mentioned before, preferably, the material of the invention comprises a ceramic composition in the form of a coating comprising up to 10% of an oxide selected from the list consisting of $Al_2O_3$, $B_2O_3$, BaO, CaO, CoO, $K_2O$, $Li_2O$, $MnO_2$, $TiO_2$ or any combination thereof.

More preferably, the material of the invention comprises a ceramic composition in the form of a coating having a weight percent with respect to the end ceramic composition expressed in terms of the following equivalent oxides:
between 54% and 66% of $SiO_2$,
between 12% and 20% of $Cr_2O_3$,
between 5% and 12% of $Na_2O$, and
between 5% and 12% of $ZrO_2$.

Last aspect of the invention refers to the use of the material of the invention as part of heat recovery unit working at metal temperatures between 400° C. and 750° C. Preferably, the heat recovery unit is selected form a boiler or an incinerator. The heat recovery unit can be an urban waste incinerator, a waste recovery boiler and a biomass boiler.

The tubes of the present invention show the following benefits:
 The tubes are easy to clean so that cleaning and maintenance costs are reduced
 The tubes present antifouling properties, high corrosion resistance, high erosion, abrasion resistance
 Longer life time expectation for the tubes
 Ashes do not stick to the tubes so thermal transfer is not affected significantly over time, cleaning can be reduced significantly or almost avoided and significant cost reduction due to tube cleaning can be achieved.

An improvement of the thermal efficiency of the heat recovery is obtained by using the tubes of the present invention.

Unless otherwise defined, all technical and scientific terms used herein have the same meaning as commonly understood by one of ordinary skilled in the art to which this invention belongs. Methods and materials similar or equivalent to those described herein can be used in the practice of the present invention. Throughout the description and claims the word "comprise" and its variations are not intended to exclude other technical features, additives, components, or steps. Additional objects, advantages and features of the invention will become apparent to those skilled in the art upon examination of the description or may be learned by practice of the invention. The following examples, drawings are provided by way of illustration and are not intended to be limiting of the present invention.

EXAMPLES

Example 1

A suspension was obtained by grinding a mixture of commercial silicate of Keracoat SL RT100 (64%-66%), clay (3%-3.7%), borax (0.15%), sodium nitrite (0.15%) and water (30%-31.7%). A smooth and homogeneous paste is formed and it is sieved to obtain an average particle size between 40 μm and 200 μm.

The ceramic composition is hereby expressed in terms of the following equivalent oxides:
61% of $SiO_2$,
16% of $Cr_2O_3$,
6% of $Na_2O$,
7% of $ZrO_2$
2% $B_2O_3$,
2% $Al_2O_3$ and
3% $TiO_2$.

This suspension was deposited onto the outer surface of a stainless steel tube. The outer surface of the tube was pretreated by shot blasting to guarantee a clean surface to get a good bonding of the ceramic coating to the steel substrate. The suspension was sprayed onto the pretreated surface and completely dried by convection at controlled temperature of 85° C. Finally, sintering was performed at 900° C.

Figure 1:
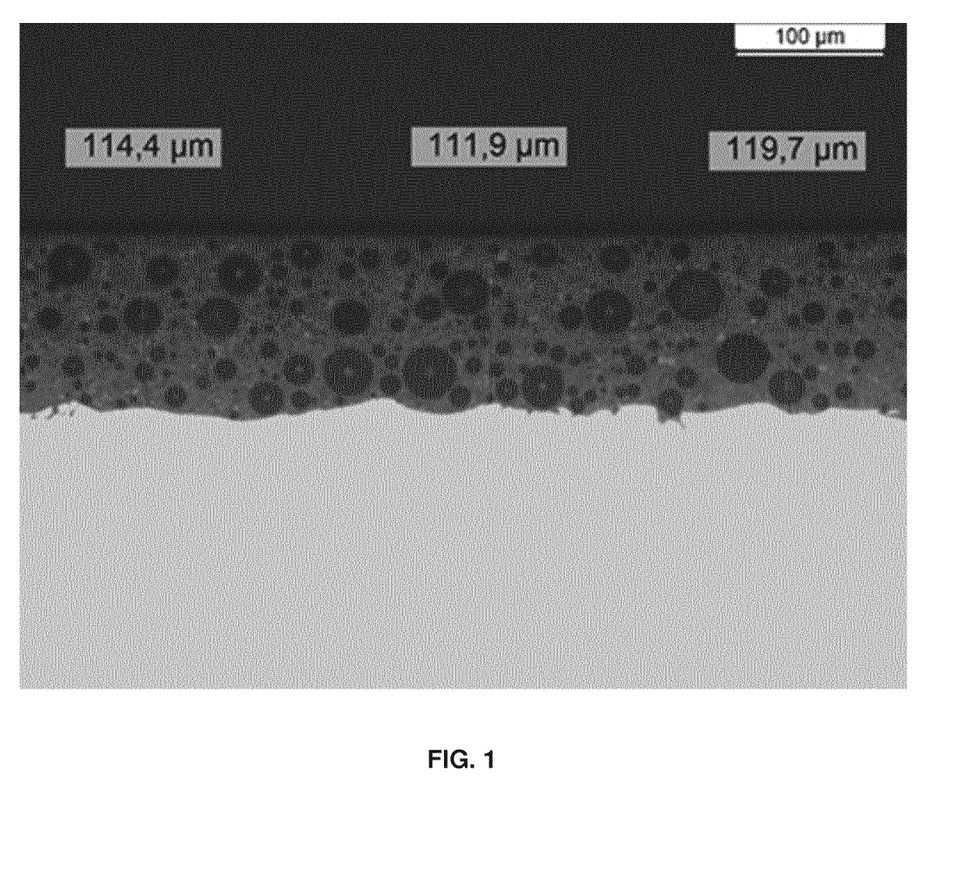
FIG. 1. Optical microscope image of substrate and ceramic coating.

FIG. 1 shows the results of the coating thickness measurements. Thickness values of 111.0 μm, 114.4 μm and 119.7 μm can be observed by optical microscope as it is shown in FIG. 1.

The ceramic coating provides a strong increase in hardness to the tube, Vickers hardness (HV) is 724 in the coated layer and 155 in the substrate.

Figure 2:
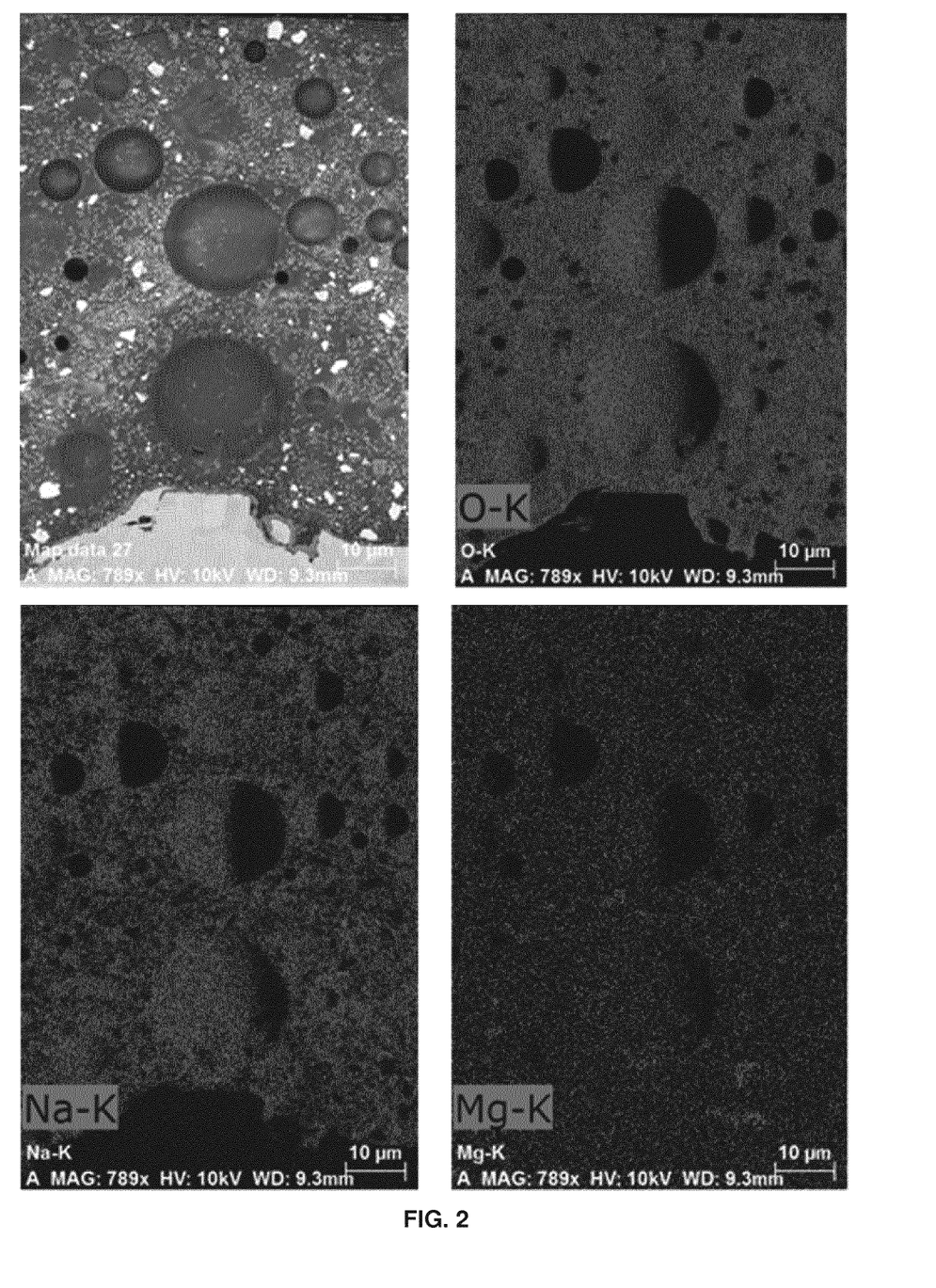
FIG. 2. Mapping results of the chemical composition of the ceramic coating analyzed by SEM-EDX technique.

The chemical composition of the ceramic composition has been analyzed using SEM-EDX technique. Mapping results showing the main chemical elements present in the coating are shown in FIG. 2.

SEM qualitative analysis: Na, Mg, Ca, Al, Cr, Si, Zn and Zr oxides.

Figure 3:
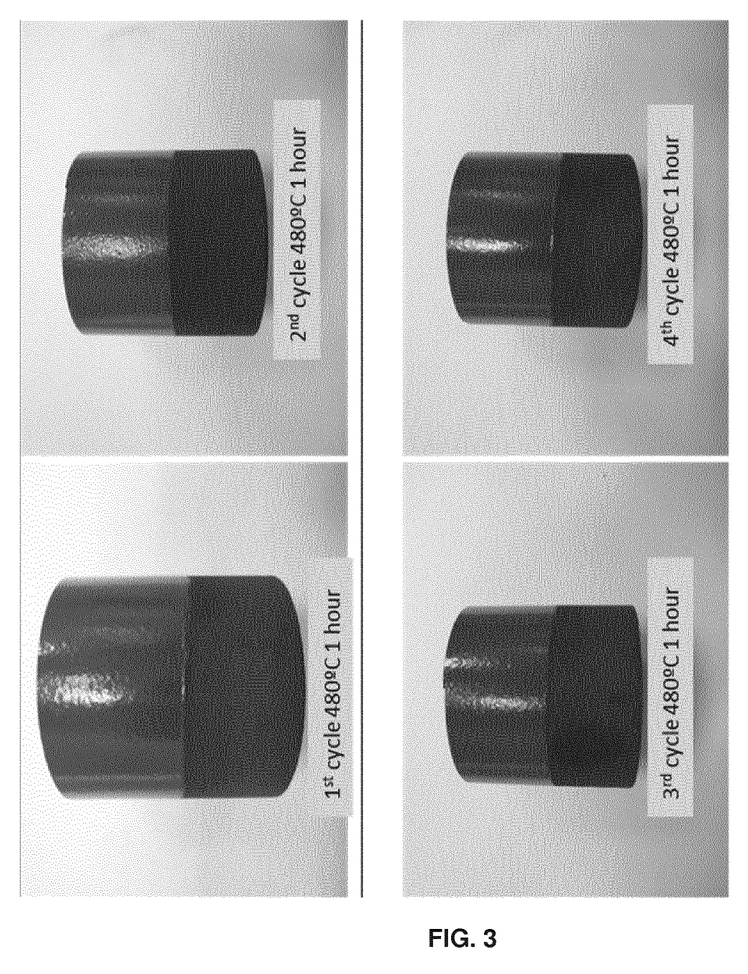
FIG. 3. Visual inspection of specimens after six thermal cycles at 480° C.

The thermal resistance of the ceramic coating deposited onto the steel substrate have been checked applying six thermal cycles at 480° C. during 1 hour, after visual inspection there is no signs of defects or deterioration on the coating (See FIG. 3).

The roughness has been measured after six thermal cycles at 480° C. during 1 hour on the substrate and on the coating. Roughness on the coating area is 0.9 μmm RA and on the substrate 6.13 μm RA.

Furthermore, a series of stainless steel tubes coated with the above mentioned ceramic coating have been exposed to real conditions being part of a reheater of an urban waste incinerator for 2 years. The working conditions at this urban waste incinerator were:

Steam temperature: 300° C.
Pressure: 170 bar
Fumes temperature: 850° C.
Inner fluid media of the tubes: steam
Outer fluid media of the tubes: waste to energy fumes
Other exposition: alkaline ashes A chemical analysis shows that the main components of the ashes are: silica, aluminum, iron and calcium and that the secondary components are titanium, magnesium, sodium, potassium or phosphate and in very small quantities barium, strontium, rubidium and heavy metals such as zinc, copper, lead, chromium, nickel or cadmium.

Figure 4:
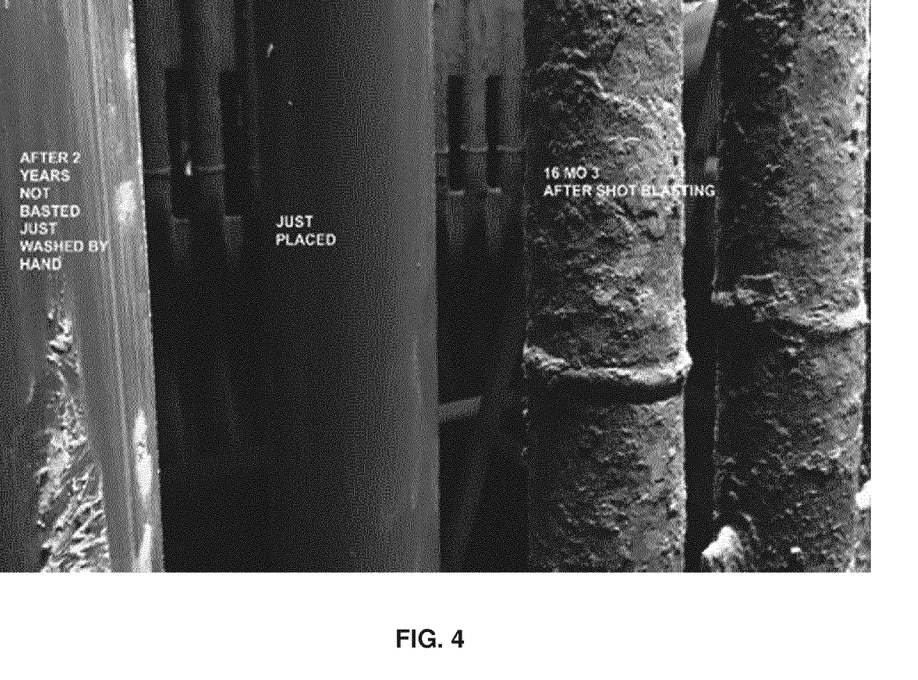
FIG. 4. Comparison between ceramic coated tubes and not ceramic coated tubes after two years' service in an urban waste incinerator.

FIG. 4 shows (from the left to the right):
a coated tube of the present invention installed two years ago and afterwards washed by hand,
a coated tube of the present invention just installed, and
two tubes (without coating) installed wo years ago and shot blasted.

As shown in FIG. 4 the ashes are removed very easily from the coated tubes of the invention, furthermore, it can be noted that the coated layer is not deteriorated.

The invention claimed is:

1. A ceramic composition characterized in that it comprises a weight percent with respect to the end ceramic composition expressed in terms of the following equivalent oxides:
    between 54% and 66% of $SiO_2$,
    between 12% and 20% of $Cr_2O_3$,
    between 5% and 12% of $Na_2O$, and
    between 5% and 12% of $ZrO_2$.

2. The ceramic composition according to claim 1, which comprises up to 10% of an oxide selected from the list consisting of $Al_2O_3$, $B_2O_3$, BaO, CaO, CoO, $K_2O$, $Li_2O$, $MnO_2$, $TiO_2$ or any combination thereof.

3. A material characterized in that it comprises the ceramic composition according to claim 1 deposited on a substrate of steel.

4. The material according to claim 3, wherein the ceramic composition has a thickness of between 100 μm and 160 μm.

5. The material according to claim 3, wherein a porosity of the ceramic composition is higher than 10%.

6. The material according to claim 3, wherein the substrate is a tube and wherein the ceramic composition is deposited on at least one of the following surfaces selected from an inner surface of the tube or an outer surface of the tube.

7. The material according to claim 6, wherein the substrate is a tube and wherein the ceramic composition is deposited on the outer surface of the tube.

8. A process to obtain the material according to claim 3 comprising the following steps:
    a) preparing a suspension of the ceramic composition comprising in weight percent the following oxides:
        between 54% and 66% of $SiO_2$,
        between 12% and 20% of $Cr_2O_3$,
        between 5% and 12% of $Na_2O$, and
        between 5% and 12% of $ZrO_2$,
    in a weight percent of between 65% to 75% and a solvent in a weight percent of between 25% to 35%, the suspension having an average particle size of between 40 μm and 200 μm,
    b) preatreating at least one surface of a substrate of steel,
    c) depositing the suspension obtained in step (a) onto the pretreated surface of step to form a coating (b),
    (d) drying the coating obtained in step (c), and
    (e) sintering the coating obtained in step (d) at temperatures between 700° C. and 1000° C.

9. The process according to claim 8, wherein the solvent of step (a) is water.

10. The process according to claim 8, wherein step (b) is performed by shot blasting.

11. The process according to claim 8, wherein step (c) is performed by electrophoretic deposition (EPD), dipping, waterfall glazing or spraying.

12. The process according to claim 11, wherein step (c) is performed by spraying.

13. The process according to claim 8, wherein step (e) is performed at temperatures between 850° C. and 950° C.

14. A heat recovery unit working at metal temperatures between 400° C. and 750° C. comprising the material according to claim 3.

15. The heat recovery unit according to claim 14 selected form a boiler or an incinerator.

* * * * *